H. KLECKLER.
TAIL SKID FOR AEROPLANES.
APPLICATION FILED APR. 16, 1917.
1,294,477.
Patented Feb. 18, 1919.
2 SHEETS—SHEET 2.
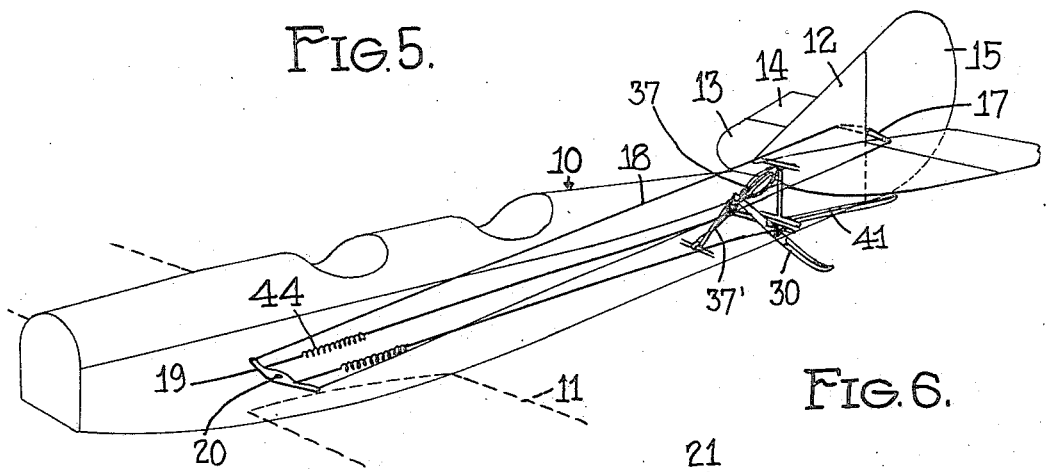
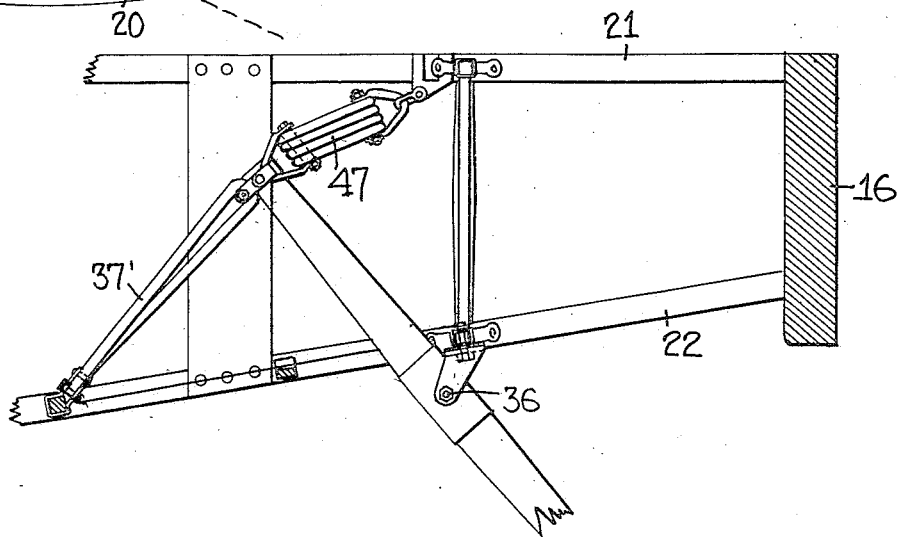
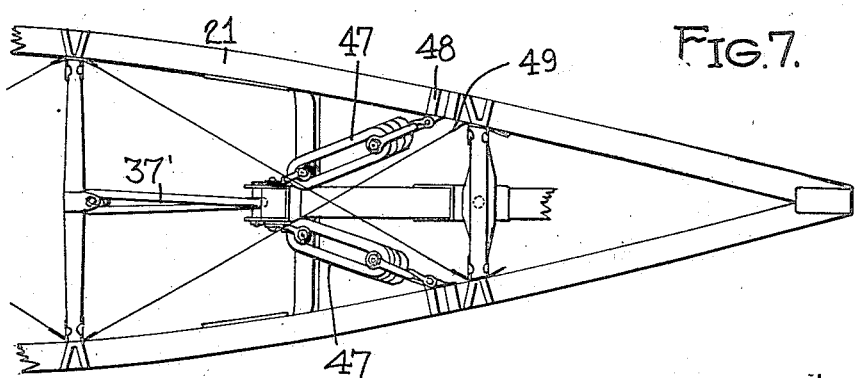
Inventor
HENRY KLECKLER.
By John P. Tacboy
Attorney

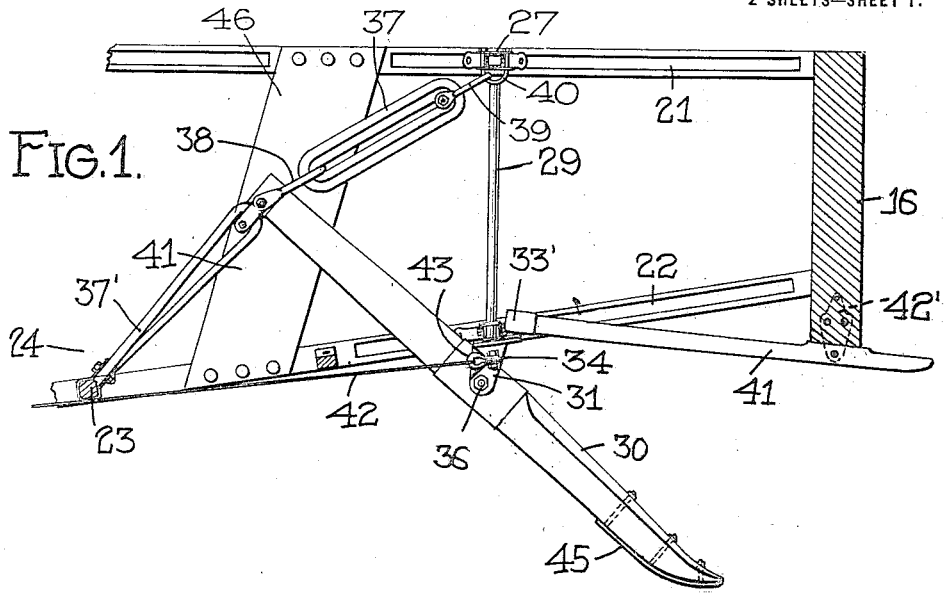
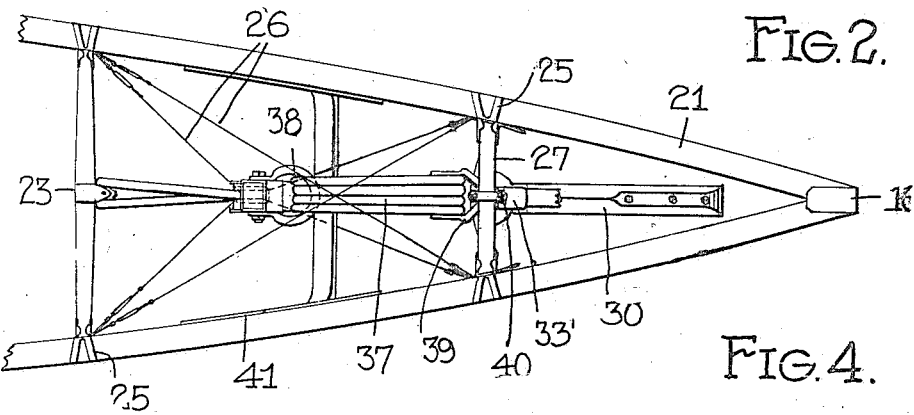
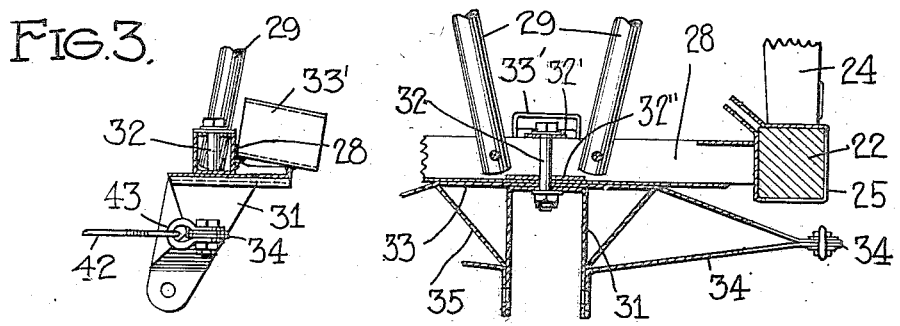

UNITED STATES PATENT OFFICE.

HENRY KLECKLER, OF BUFFALO, NEW YORK, ASSIGNOR TO CURTISS AEROPLANE AND MOTOR CORPORATION, A CORPORATION OF NEW YORK.

TAIL-SKID FOR AEROPLANES.

1,294,477.  Specification of Letters Patent.  Patented Feb. 18, 1919.

Application filed April 16, 1917. Serial No. 162,531.

*To all whom it may concern:*

Be it known that I, HENRY KLECKLER, a citizen of the United States, residing at Buffalo, in the county of Erie and State of New York, have invented certain new and useful Improvements in Tail-Skids for Aeroplanes, of which the following is a specification.

My invention relates to tail skids for aeroplanes and has for its object the production of an improved steering tail skid in which directional control is obtained through movement of the skid bar laterally and while the craft is running along the ground. For convenience in operation the skid bar is directly connected with the usual rudder control (the foot bar of a Curtiss machine) and is capable of both vertical and horizontal pivotal movement. By movement of the skid bar vertically, shocks incident to land travel are absorbed and by transverse movement of the skid bar directional control is effected. Shock absorber elastics are provided to yieldingly resist movement of the bar. Moreover, the pivot axes of the bar lie in such adjacency that all binding tendency arising through duplex movement is eliminated.

A further feature of the invention is the mounting or support for the skid bar. Abutting bearing surfaces, fixed and movable respectively, characterize said mounting, the movable part being equipped with laterally extending lever arms for connection with the control leads. The fixed part is intimately associated with the fuselage or body of the craft and is preferably in the form of a metal horizontal fuselage strut appropriately braced. Furthermore, the skid bar mounting is utilized as a support for an appropriate emergency skid rigidly united with the fuselage. Also, if desired, appropriate reaction elastics for the movable skid bar may be used.

Of the drawings, wherein like characters of reference designate like or corresponding parts:

Figure 1 is a longitudinal vertical sectional view of the tail end of the fuselage of an aeroplane equipped with the steering tail skid of my invention;

Fig. 2 is a top plan view of that portion of the fuselage and its equipment illustrated in Fig. 2;

Fig. 3 is an enlarged transverse sectional view illustrating the vertical pivot axis of the skid bar together with that portion of the fuselage in the immediate vicinity thereof;

Fig. 4 is a side elevation of the skid bar mounting as illustrated in Fig. 3, the mounting being partly in section;

Fig. 5 is a diagrammatic perspective view showing the connection between the foot bar, the vertical rudder, and the steering tail skid;

Fig. 6 is a view similar to Fig. 1 illustrating a modification, and

Fig. 7 is a view similar to Fig. 2 further illustrating said modification.

The aeroplane illustrated in Fig. 5 comprises the usual fuselage or body 10, supporting surfaces 11, vertical stabilizer 12, horizontal stabilizer 13, elevator flaps 14 and vertical rudder 15, the latter, as in most machines, overhanging the stern post 16 of the fuselage. Horns 17 extend out right and left from the opposite sides of the rudder 15 for connection with the usual rudder leads 18. These leads 18 extend forwardly into the fuselage 10 for connection with the rudder control means which may be of any well known form. The control means herein illustrated is of the manual type and comprises a foot bar 19 pivoted as at 20 in convenient proximity to the pilot's seat. Directional control of the craft in a lateral plane is obtained through manipulation of said bar.

In addition to the stern post 16, the fuselage 10 comprises the usual upper longerons 21, lower longerons 22, horizontally extending fuselage struts 23, and vertically extending fuselage struts 24. The curvature of the longerons or the shape of the body of the craft is immaterial. Fuselage clips or fittings 25 retain the struts 23 and 24 and the longerons 21 and 22 against relative movement. From end to end in both a horizontal and a vertical plane the fuselage is wired or trussed as indicated at 26, all wires being cross arranged.

For maximum strength, the rearmost horizontal fuselage struts are constructed of metal, the upper horizontal strut 27 interconnecting the longerons 21 and the lower horizontal strut 28 the longerons 22. Both struts terminally engage in fuselage fittings 25 as do the wooden struts 23 and 24. Upwardly diverging metal rods 29 interbrace the struts 27 and 28, the rods extending from points at opposite sides of the center of the lower strut 28 to the respective terminals of the upper strut 27. Between the rods 29 and to the lower strut 28 the tail skid or rather the skid bar 30 thereof is indirectly fastened. Said bar 30 is movable in rectangularly opposed planes, preferably vertically and horizontally.

The skid bar mounting comprises an inverted substantially U-shaped fitting 31 having its bight portion fastened to the strut 28. A pivot pin 32, vertically extending, is utilized as the fastening means. The strut 28, it will be noted, is channeled throughout, and at a point intermediate the braces 29, equipped with a plate 32' through which the pivot pin 32 extends. Said plate 32' and a fixed or bearing plate 32'' reinforce the strut 28. A movable bearing surface 33 is mounted to firmly abut or contact said fixed bearing surface. The movable bearing surface 33 is integrally united with the U-shaped fitting 31, and like said fitting is equipped with arms or extensions. Pairs of said extensions or arms constitute lever arms 34. These arms extend right and left from said fitting 31 and said surface 33, the pairs of arms outwardly converging (see Fig. 4) for abutting contact terminally. Said arms 34 are braced diagonally as indicated at 35, the braces, the fitting and the arms being integrally united.

The legs or extensions of the fitting 31 receive between them the skid bar 30, said bar being pivoted as at 36 with its axis extending horizontally or at a right angle to the pivot axis referred to above. Said axes, it will be noted, lie in such adjacency, i. e.,—one directly above the other, that all binding tendency arising through movement of the skid bar is eliminated. Furthermore, the bearing surface 32'' forming a part of the skid bar mounting is provided with a brazed on or integrally united socket 33'. The purpose of this socket will later appear. Its location, however, may be described as directly aft of the pivot pin 32 with its bottom edge in abutting contact with the top face of said bearing surface 33. The width of the bearing surface 33 is somewhat greater than the width of the co-acting bearing surface of the strut 28.

The length of the skid bar 30 is sufficient to extend from a point within to a point well without the tail end of the fuselage. Said bar, at its inner forward end is fastened by means of shock absorber elastics 37, straps 38 and 39 and a U-bolt 40 to the upper horizontal strut 27 at a point preferably equidistant from its ends. The U-bolt 40 accordingly embraces said strut in the vertical plane of the pivot axes 32 and 36 that lateral swinging movement of the skid bar may be effected with the utmost ease. Said elastics 37 yieldingly resist pivotal movement of the skid bar 30 in a vertical plane. Rebound or reaction elastics 37', fastened to the inner end of the skid bar 30 and to the horizontal strut 23 next in advance of the strut 28, absorb all reaction strains. The elastics 37 and the elastics 37' collectively resist lateral pivotal movement of the skid bar.

To prevent destruction of the tail end of the fuselage in the event that the skid bar 30 should fail to function as intended, an emergency skid bar 41 is provided. Said bar is fastened or seated at its forward end within the socket 33' of the mounting and in the vicinity of its rear end securely fastened as at 42 against the under or lower extremity of the stern post 16. It is preferred in this connection that the stern post extend beyond the horizontal plane of the longerons 22 (see Fig. 1).

In connecting the skid bar with the foot bar 19, flexible control leads 42 are used. Said leads are fastened to the extremities of the lever arms 34 by shackles 43 pivoted to said arms. At their forward ends the leads 42 are fastened to the foot bar 19 at opposite sides of its pivot 20. Accordingly, as the foot bar is manipulated, the tail skid is moved, the movement of the tail skid and the movement of the rudder 15 being alike and simultaneous. If desired, tension devices 44 may be interpolated in the connection between the foot bar 19 and the lever arms 34 to yieldingly resist movement of the skid bar laterally under side swipe strains, yet permit of its movement should the foot bar be held rigid at the time the side swipe occurs. Obviously all tendency to snap or break the leads 42 is thus avoided.

Terminally, the skid bar 30 is equipped with a wearing plate 45 which may be removed and replaced when required. Furthermore, guard strips 46, inclined to the vertical, may be placed at each side of the forward end of the skid bar to prevent puncture of the fabric covering of the fuselage should the skid bar be deflected laterally unduly. These guard strips 46 also function as longeron braces and accordingly strengthen the fuselage at a point where reinforcement is desirable by reason of the location of the tail skid adjacent said point.

In the modification illustrated in Figs. 6 and 7, the auxiliary or emergency tail skid is dispensed with as is also the steering feature herein disclosed. Instead of a single set of centrally located elastics 37, rearwardly diverging sets of elastics 47 are provided. These elastics are connected to the forward upper end of the skid bar and to the longerons of the fuselage in the vicinity of the fittings 25 which accommodate the rear horizontal strut 27. The fittings 48 to which the elastics 47 are fastened are in turn fastened as at 49 to the fittings 25. In other respects the tail skid of the modification is quite similar to that disclosed with reference to the preferred form.

While the struts have been described as constructed of metal and the lever arms 34 as of special form, it is obvious that such and similar parts may be changed considerably without departing from the spirit of the invention. No limitation, except in so far as the claims require is intended to be made.

What is claimed is:

1. In an airplane, the combination with the fuselage, of a fitting mounted beneath a structural element of the fuselage, a skid bar, a pivotal connection between the skid bar and the fitting, and means bracing the element of the fuselage beneath which the fitting is mounted from above.

2. In an airplane, the combination with the fuselage, of a fitting mounted beneath a structural element of the fuselage, a pivotal connection between the fitting and the element, a skid bar having its forward end extended into the fuselage, a pivotal connection between the skid bar and the fitting, the respective pivot axes lying in intersecting planes spaced vertically one above the other, and elastic means connecting the inclosed end of the skid bar to yieldingly resist its displacement.

3. In an airplane, the combination with the fuselage, of a fitting mounted beneath a structural element of the fuselage, a pivotal connection between the fitting and the element, a skid bar, a pivotal connection between the skid bar and the fitting, control leads, and arms laterally extending out from the fitting for connection with the control leads.

4. In an airplane, the combination with the fuselage, of a skid bar carried beneath a structural element of the fuselage, a pivotal connection between the skid bar and the element, control leads, and arms extending laterally out from the skid bar for connection with the control leads.

5. In an aeroplane, longerons, a horizontally extending fuselage strut connecting said longerons, a fitting of substantially U-form having its bight portion arranged for contact with said strut at a point intermediate its ends, a connection between said fitting and said strut, a skid bar engaging between the extensions and said fitting, and a connection between said bar and said extensions.

6. In an aeroplane, longerons, a fuselage strut connecting said longerons, a fitting of substantially U-form having its bight portion in abutting contact with said strut, a pivot connection between said fitting and said strut, a skid bar engaging between the extensions of said fitting, and a pivot connection between said bar and said extensions, the pivot axes lying in intersecting planes and one above the other.

7. In an aeroplane, longerons, fuselage struts connecting corresponding longerons, a skid bar, a pivot connection between said bar and the one of said struts, and an elastic connection between said bar and one of the struts above said first mentioned strut, said pivot connection and the connection of the elastic means with the last mentioned strut being substantially vertically alined.

8. In an aeroplane, longerons, fuselage struts connecting corresponding longerons, a skid bar, a fitting, a pivot connection between said bar and said fitting, a pivot connection between said fitting and the one of said struts, and an elastic connection between said bar and one of the struts above said first mentioned strut, said pivot connections and the connection of the elastic means with the last mentioned strut being substantially vertically alined.

9. In an aeroplane, longerons, horizontal fuselage struts connecting corresponding longerons, a skid bar, a two-way pivot connection between said bar and one of said horizontal struts, and elastic connections between said bar and one or more of the elements of the fuselage other than said horizontal strut for maintaining said bar yieldingly in a determined position.

10. In an aeroplane, longerons, fuselage struts connecting corresponding longerons, a movable skid bar, shock absorber elastics connecting said bar and said fuselage for yieldingly resisting movement of said bar, and reaction elastics for said bar, the strength of the reaction elastics being less than the strength of the first mentioned elastics.

11. In an aeroplane, longerons, a movable skid bar partly inclosed within the body of the craft, a means interconnecting said longerons in the plane of the inclosed end of the skid bar to limit its movement when disturbed, said means additionally functioning as a brace for the longerons at a point in the vicinity of said skid.

12. In an aeroplane, a movable tail skid, elastic means for yieldingly resisting movement of said skid, a fixed auxiliary skid mounted in a plane above said movable skid, and a support common to both said movable and said fixed skid.

13. The combination with an aeroplane fuselage, of a tail skid comprising a skid bar movable both laterally and vertically, one end of the skid bar being inclosed in the fuselage, together with elastic means entirely inclosed in the fuselage for yieldingly resisting such movement, the anchorages for the elastics being so arranged that the tension strains imposed on the fuselage by distension of the elastics are distributed equally upon opposite sides thereof.

14. The combination with an aeroplane fuselage, of a tail skid comprising a skid bar partly inclosed in said fuselage, said bar being movable laterally, together with means limiting such lateral movement to an extent determined only by the width of the fuselage.

15. A tail skid for aeroplane fuselages including a skid bar supported intermediately by contact with one of the horizontally extending fuselage struts, together with elastic means extending rearwardly and upwardly from the inner end of the skid bar for connection with a second horizontally extending fuselage strut.

16. The combination with the rudder and rudder control mechanism of an aeroplane, of a steering tail skid comprising a laterally movable skid bar together with connections between said bar and said rudder control mechanism so arranged that the skid bar and rudder may be simultaneously and correspondingly moved in effecting lateral directional control, the form of connection being such that the binding of the skid bar will interfere in no way with the steering function of the rudder.

17. The combination with the rudder and rudder control mechanism of an aeroplane, of a steering tail skid comprising a laterally movable skid bar together with yielding connections between said bar and the rudder control mechanism so arranged that the skid bar and rudder may be simultaneously moved or the rudder independently moved in effecting lateral directional control should the skid bar fail to operate through binding action or other cause.

18. The combination with the rudder and foot bar control mechanism of an aeroplane, of a steering tail skid comprising a laterally movable skid bar together with separate and entirely independent connections respectively between the rudder and the foot bar and the skid bar and the foot bar, said connections being so arranged that normally both said rudder and said skid bar will move together in effecting lateral directional control.

19. The combination with the rudder and foot bar of an aeroplane, of a steering tail skid comprising a movable skid bar and connections respectively between the skid bar and the foot bar and the rudder and the foot bar so relatively arranged that foot space is afforded between them, said connection also functioning as stops against which the feet abut.

20. In an airplane, the combination with the fuselage, of a normally active tail skid mounted beneath the fuselage and inclosed partly within its confines, a normally inactive tail skid vertically spaced above and to the rear of the active tail skid, the inactive tail skid being likewise mounted beneath the fuselage, and connections respectively between the normally active tail skid and the fuselage and the normally inactive tail skid and the fuselage, said connections being so arranged that damage to either will in no way impair the effectiveness of the other.

21. In an airplane, the combination with the fuselage, of a tail skid arrangement including separate and independently acting tail skids respectively normally active and inactive, said inactive skid being positioned above the active tail skid to become active only in the event that the normally active skid becomes inactive through damage, breakage, or other cause, and separate connections respectively between the tail skids and the fuselage, the character of the connections being such that damage to either connection would in no way affect the utility of the other.

In testimony whereof I hereunto affix my signature.

HENRY KLECKLER.